United States Patent [19]

Mouton, Jr. et al.

[11] 4,166,596

[45] Sep. 4, 1979

[54] AIRSHIP POWER TURBINE

[76] Inventors: William J. Mouton, Jr., Box 10515, New Orleans, La. 70181; David F. Thompson, 2540 Green St., Chester, Pa. 19013

[21] Appl. No.: 901,161

[22] Filed: Apr. 28, 1978

Related U.S. Application Data

[63] Continuation-in-part of Ser. No. 764,251, Jan. 31, 1978, abandoned.

[51] Int. Cl.² .......................... B64B 1/02; B64B 1/50; F03D 9/00
[52] U.S. Cl. ........................................ 244/30; 244/33; 290/44; 290/55; 415/2
[58] Field of Search ............... 244/30, 33, 73 R, 58, 244/115, 116, 153 R; 415/2, 7; 290/44, 55

[56] References Cited

U.S. PATENT DOCUMENTS

| | | | |
|---|---|---|---|
| 1,312,021 | 8/1919 | Dickinson et al. | 290/55 |
| 1,355,672 | 10/1920 | Howden | 290/44 |
| 1,619,680 | 3/1927 | Richmond et al. | 244/115 |
| 1,717,552 | 6/1929 | Dunn | 244/58 X |
| 2,384,893 | 9/1945 | Crook | 244/73 R |
| 3,533,578 | 10/1970 | Lesh | 244/30 |
| 3,987,987 | 10/1976 | Payne et al. | 290/55 X |
| 3,993,269 | 11/1976 | Crosby | 244/33 |

FOREIGN PATENT DOCUMENTS

| | | | |
|---|---|---|---|
| 105536 | 2/1927 | Austria | 244/33 |
| 349421 | 3/1922 | Fed. Rep. of Germany | 290/55 |
| 830628 | 2/1952 | Fed. Rep. of Germany | 244/33 |
| 466172 | 10/1951 | Italy | 244/33 |
| 489139 | 7/1938 | United Kingdom | 244/153 R |

*Primary Examiner*—Barry L. Kelmachter
*Attorney, Agent, or Firm*—Rollin D. Morse

[57] ABSTRACT

Power is mechanically transmitted from a tethered airship carrying wind turbines to electrical generators on the ground at the anchor point of the tether, by the use of endless power-transmission cables bridging between drive sheaves at the turbine wheels and driven sheaves at the generators. Tether adjustments, cable tensioning, and wind direction changes are provided for the ground apparatus. A tubular aircraft with recess in the tube wall, carrying bearings on which the rims of the turbine wheels ride, is also claimed.

12 Claims, 8 Drawing Figures

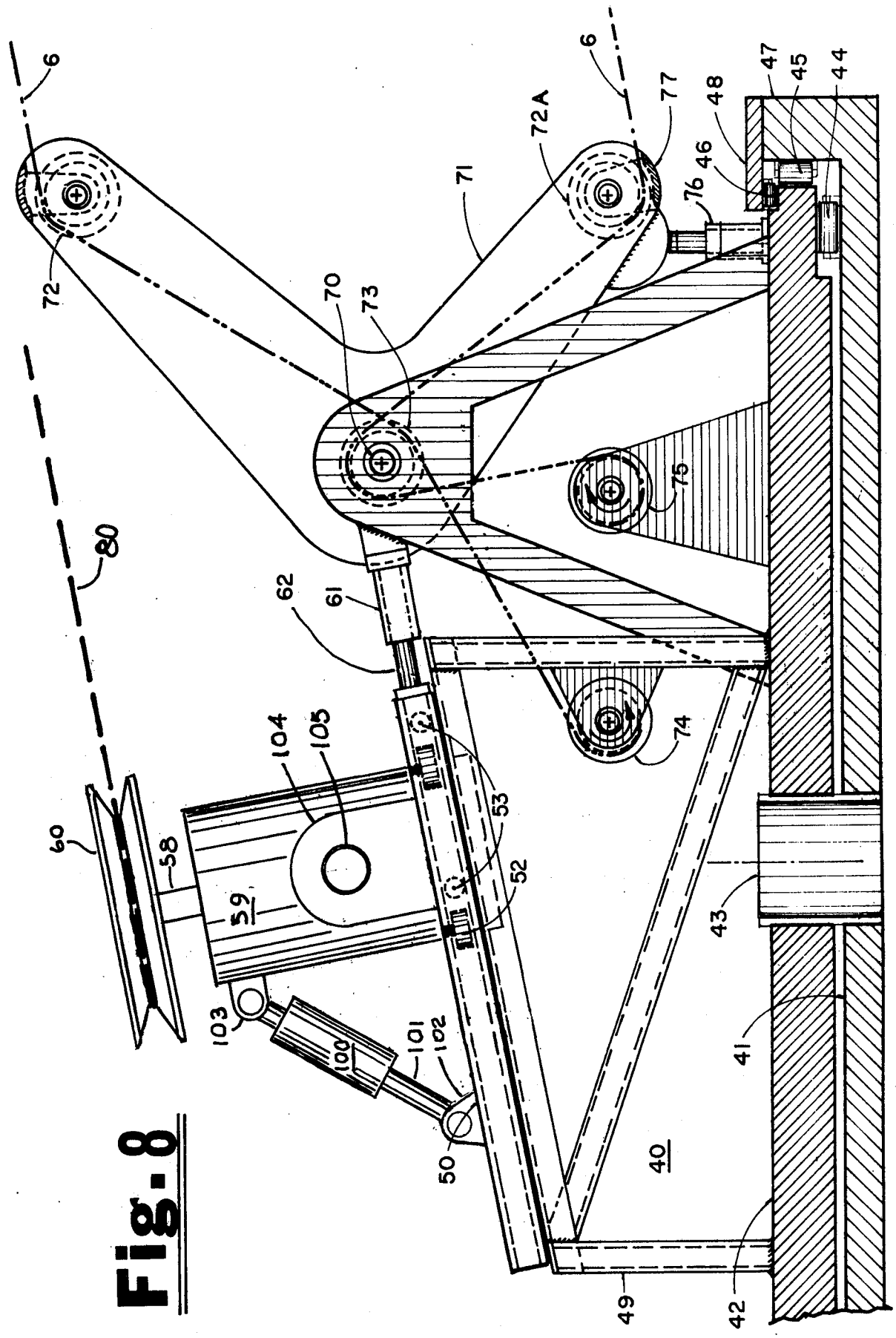

AIRSHIP POWER TURBINE

REFERENCE TO EARLIER INVENTIONS

This application is a continuation-in-part, of application application Ser. No. 764,251, now abandoned. U.S. Pat. No. 3,986,787, to the present inventors, entitled River Turbine, concerns an under-water version of a current motor. U.S. Pat. No. 4,025,220, also to the same inventors, concerns a Fluid Current Turbine with Flexible Collectors, and U.S. Pat. No. 4,095,918, allowed Feb. 3, 1978, also to the present inventors, concerns a Turbine Wheel with Catenary Blades.

STATE OF THE ART

The use of windmills to remove power from passing winds goes back at least several centuries, and brings to mind the much pictured old Dutch windmills with four large blades or sweeps, mounted at the front of tall enclosed towers, within which were commonly mills for the grinding of grain. In the United States there are still in use small multibladed windmills mounted atop of tall steel towers, and having gearing leading usually to jack rods, the rods extending downwardly to water pumps. Recently there have been publications describing very large two-blade windmills, purportedly for the generation of considerable amounts of electrical power with generators directly coupled to the shaft of the windmills, atop the mounting tower. In all of these cases a tower has been used to elevate the blades of the windmill as high as practical, in order to put the blades in regions of higher wind velocity. It has been long known that the wind velocities continue to increase with elevation, for some thousands of feet, but only a little work has been described concerning the utilization of these high velocities, and no successful developments are known. Perhaps the greatest obstacle to successful removal of large amounts of power from higher altitude winds has been the conversion of the power into a form that would facilitate the conduction of the power to the ground for utilization.

British Pat. No. 489,139 (1937) to Van Gries acknowledges that it was already old to arrange wind-driven machines with dynamos on captive baloons or kites. The patent then goes on to describe a system in which the guy-rope is formed as an electrical cable for conducting the power to the ground. It also states that "the energy generated by the wind wheel may also be led or transmitted positively mechanically directly to the ground by means of the guy-rope" but it contains no information as to how the force on the guy-rope would be coupled with any kind of translational motion, to obtain energy (which by definition requires the product of force and speed, for example, in units of lbs. force times ft./sec.).

Italian Pat. No. 466,172 (1951) to Mario Caraco describes a wind-power system in which a tethered balloon has suspended below it a basket containing an electrical generator, which is powered from the wind by a pair of counter-rotating propellers, both mounted on the generator shaft. The power generated is conducted to the ground through a pair of insulated conductors extending to the ground next to the tether cable.

Neither of the above two references nor any others known to applicants disclose means whereby one could intercept the wind over very large areas, such as 100,000 square feet, and abstract from that wind a large fraction of its energy. Calculations show that lighter-than-air craft apparently cannot be made with lift enough to carry not only appropriate turbine wheels, but also the very large generators and the weight of the cable to conduct the power to the ground.

U.S. Pat. No. 3,987,987 to Payne, entitled "Self-Erecting Windmill", concerns several variations of aircraft, including lighter-than-air ships, kites, and autogyros, all of which are tethered in the wind, to extract energy therefrom. The energy extracted is transmitted to the ground by one of the three following schemes:

1. A windmill carried on the ship drives an electrical power generator, which is connected to a conductor leading down the tether line to ground, much the same as British Patent 489,139 to Van Gries, heretofore discussed.

2. One or two tethered aircraft are steered to move in a large diameter circle in the wind, and their tether leads to the outer end of a lever arm at the ground, the vertical lever axis being fixed to a power utilizing device. As the craft circle in the wind, the lever is pulled around in a small circle at the ground, thereby rotating the power utilization device.

3. The tethered aircraft is steered to move to and fro in zig-zag fashion in the wind, and the tether line is split into two lines enroute to ground. (a) In one variation, the split lines lead individually to the outer two ends of a lever, the center of which is pivoted on the vertical shaft of a power-utilization device. The aircraft's zig-zag motion causes the lever to oscillate through a small angle, thereby powering the utilization device. (b) In a second variation, the tether line, upon splitting, leads one side to a first sheave on a power utilization device on the ground, thence to a second sheave on the ground, spaced away from the first sheave, thence back to the splitting point. The aircraft's zig-zag motion causes the tether line to oscillate back and forth, which causes the sheaves to rotate, first in one direction, then in the opposite. In contrast, the present invention produces a steady, non-oscillating, motion of the at least one, endless power-transmission cable, it being an elongated loop passing between air-borne drive sheaves, and ground-carried driven sheaves, and the aircraft stays in a relatively constant position in the air, which is highly advantageous.

OBJECTS OF THE PRESENT INVENTION

It is applicants' intention to satisfy a need for means and method for abstracting power from winds at elevated heights above the ground, on a scale far larger than ever contemplated before. An object is to capture wind at high elevation, on a 100,000 square foot scale, funnel the wind through turbines, convert a large fraction of the wind energy to mechanical energy, conduct the mechanical energy to the ground, and there convert it to electrical energy.

SUMMARY OF THE INVENTION

The above objects and others are achieved by the present invention, in which a tubular lighter-than-air craft is provided in sequence along a wind flow direction with an entrance end, a nozzle reducing in diameter from the entrance end to a vena contracta, and a gradually expanding section flaring from the vena contracta to a discharge tail end of cross section at least as large as the cross section of the entrance end. The exterior surface of the said craft is of generally circular cross section, beginning with a diameter of the entrance end, flaring rapidly to a maximum diameter exterior to the vena contracta region, gradually necking in to a minimum diameter about half-way from vena contracta to tail, and then increasing gradually in diameter to a sharp edge junction with the interior at the tail. The exterior surface may be provided with projecting airfoil surfaces for steering purposes, for elevational control purposes, and for offsetting any rotational forces. Bridle means are provided for attaching at least one tethering cable to the tubular craft.

In preferred form, an annular secondary lighter-than-air craft is mounted coaxial to and surrounding the tail end of the primary craft, and is of somewhat larger diameter, so that an annular vena contracta is formed in the space between the tail exterior and the interior of the secondary craft.

The annular secondary craft may bear control surfaces instead of or in addition to those on the primary craft.

For power generation purposes, the tubular interior of the primary craft is provided near its vena contracta with an annular recess within which are mounted bearing means upon which means are carried the shroud-ring rims of a pair of counter-rotating axle-less turbine wheels. In one form of the invention, the said rims are each provided with gear teeth, coupling into a mating gear on a shaft at right angle to the turbines' centerline. The said shaft is extended through the wall of the craft to the exterior surface, and is provided with a sheave that drives an endless cable leading downwardly from the craft generally parallel to the tether to a driven sheave at the ground. The driven sheave delivers power to a coupled electrical generator.

In another form of the invention, instead of the gear arrangement, the outer rim surface of the turbine wheel is itself the driving sheave, and the endless cable extends outwardly through the wall of the craft, is carried around angle-changing idler sheaves, and extended toward the ground to the previously described driven sheave.

At the ground, a base plate is fixed in the ground surface sufficiently strongly to resist both horizontal wind forces and vertical lifting forces. On the top surface of the base plate there is provided a vertical pivot pin and a set of trunnion bearings disposed in a circle around the pin. On the pin is pivoted a turntable, its edges being supported and restrained by the trunnion bearings, to enable ready rotation of the turntable in response to changes in wind direction, yet to prevent the plate being lifted or otherwise pulled off its pivot by wind forces.

Carried upon the top surface of the turntable is a set of winches to which are attached the tether cable or cables, and a mounting for the aforesaid generator and driven sheaves, the mounting including shock absorbing means, endless cable tensioning means, and yaw-control means.

BRIEF DESCRIPTION OF THE DRAWINGS

FIG. 8 shows the turntable apparatus for use with the single endless cable.

DESCRIPTION OF THE INVENTION

Figure 1:
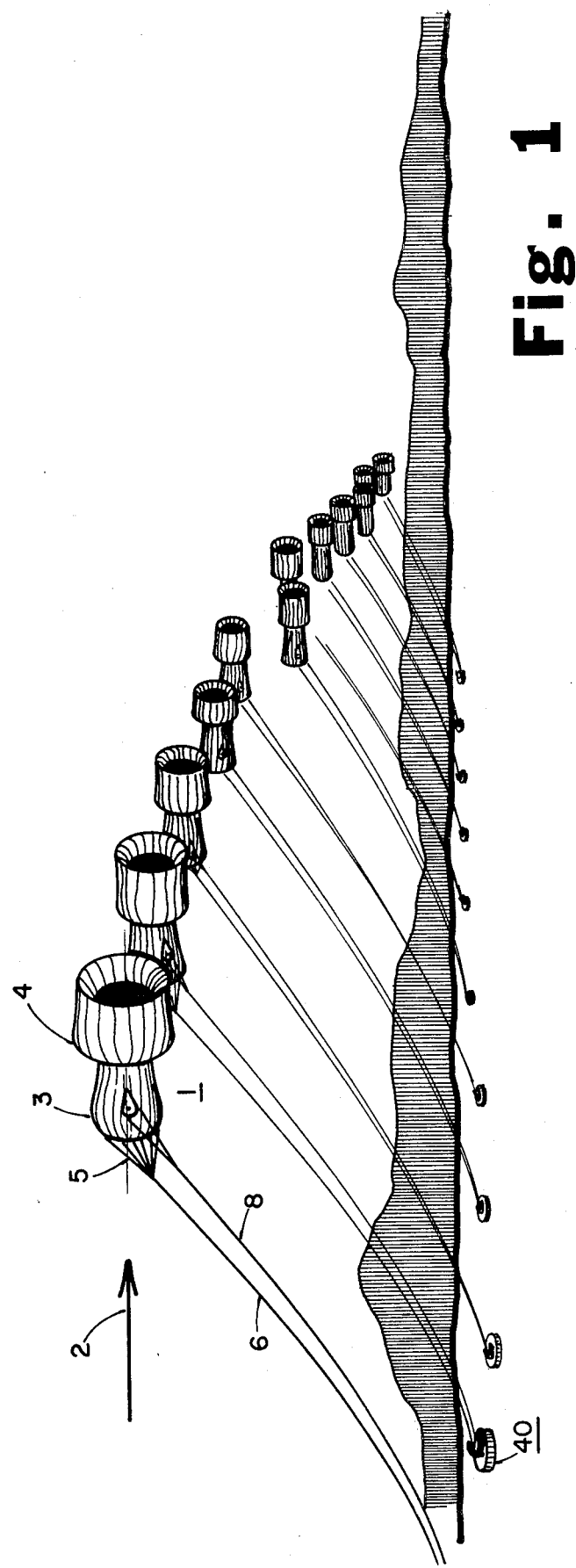
FIG. 1 illustrates several airship power turbines according to this invention tethered in a wind.

In FIG. 1 there is shown a tubular lighter-than-air craft of this invention, generally designated 1, and tethered through a bridle comprising a cone of cables 5, converging to a tether cable 6, which extends downward toward the ground, where the cable is attached to a turntable baseplate arrangement generally designated 40. To aid the understanding of the orientation of the craft, an arrow 2 shows the direction of the wind.

Figure 2:
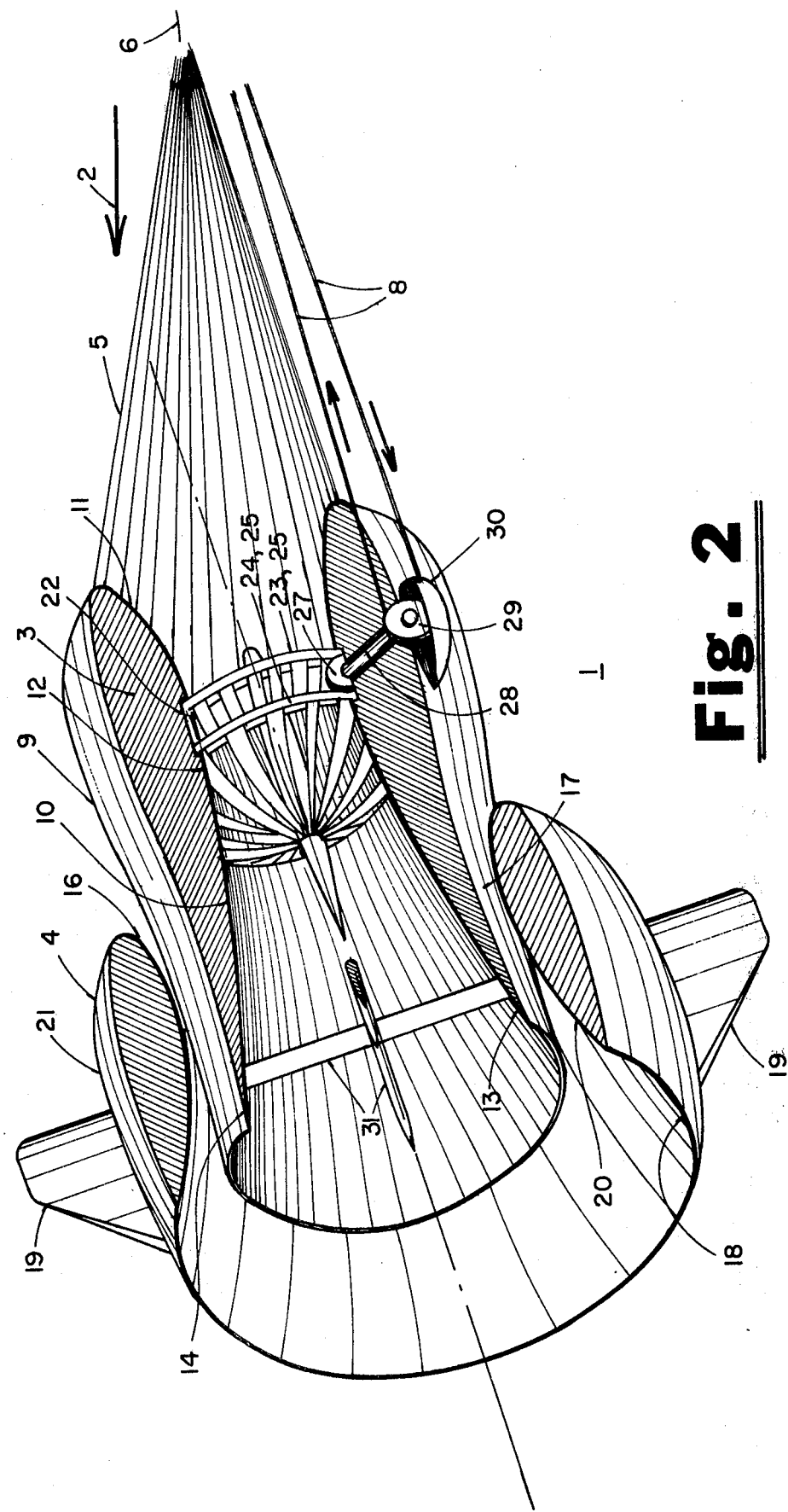
FIG. 2 illustrates a partially sectioned isometric view of the lighter-than-air craft.
Figure 3:
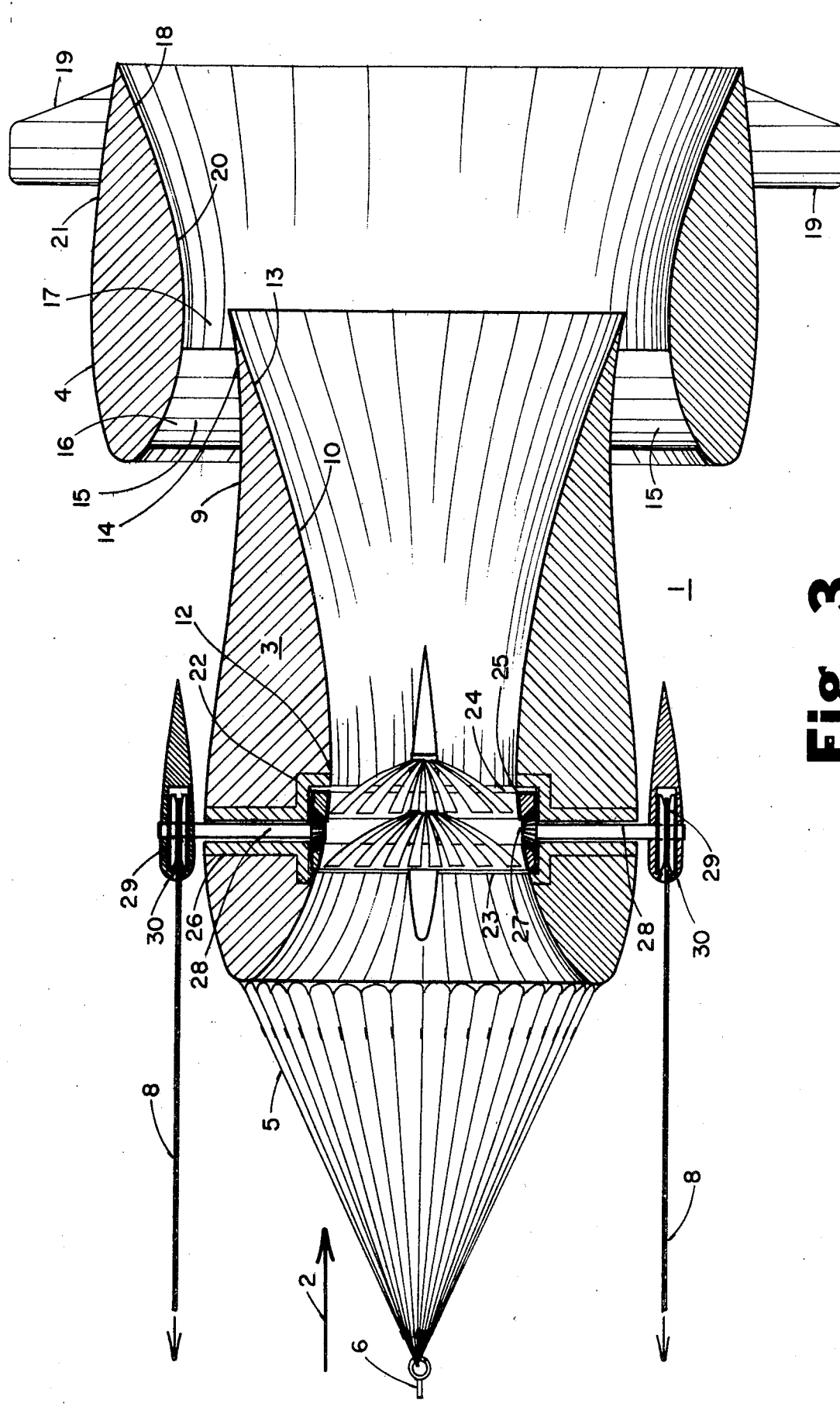
FIG. 3 shows a plan section of the lighter-than-air craft.

In FIGS. 2 and 3, the primary, or basic, lighter-than-air craft is designated 3. It is a semi-rigid tubular airship, largely held in shape by the pressure of the inflating gas, comprising helium, upon the skins of the airship. The airship has an outer skin, 9 and an inner skin 10, both skins being generally tubular, and being joined to one another at each of the ends of the tubes, the end designed for heading into the wind being termed the entrance, and the opposite end being termed the tail. Flexible tensile members may be used at numerous points to join the outer skin to the inner skin, and individual diaphragms may be used to subdivide the interior volume into smaller volumes, for reducing rate of gas loss from leaks, for avoiding catastrophic descent in case of a bad leak, and for controlling shape and distention of the parts of the ship.

The shape of the inner skin 10 is such as to form a tubular structure decreasing from the entrance end 11 in a smoothly faired passage to a vena contracta 12, or minimum diameter cross section, the decrease taking place sufficiently rapidly as to form an aerodynamically efficient converging nozzle. At the vena contracta, an annular recess 22 extending outwardly from the vena contracta diameter is provided for housing the rims 25 and bearings for turbine wheels shortly to be described. A disc-like rigid structure 26 can be included between the inner skin and the outer skin at this region of the airship, and this rigid structure can provide the necessarily rigid framework for the turbine bearings and for the mechanical arrangements 28 required for bringing out power from the turbine blades. From the vena contracta to the tail 13 the inner skin flares out gradually.

The outer skin 9 from its beginning at the entrance end 11 increases to a maximum diameter shortly to the rear of the vena contracta then decreases to a minimum "waistline" about two thirds of the distance to the tail 13, after which it increases again to the tail diameter.

The above changes in shapes are designed with a dual purpose: first, it is desirable to accelerate wind entering the entrance smoothly and efficiently to a higher velocity at the vena contracta, then to decrease that velocity efficiently to a low discharge velocity at the tail, and on the outside of the outer skin it is desirable to deflect the passing mainstream of wind outward at the discharge of the inner stream, whereby to improve the efficiency of diffusion of the inner stream as it re-enters the atmosphere; second, since the center of gravity of the airship will be near its largest masses, which are the turbine wheels, their bearings, and the power removal arrangements, it is desirable that the center of lift be near this same point or region, and this positioning is achieved by having the largest net area between inner and outer skins also near the vena contracta.

Around the entrance of the tubular airship are provided attachment fixtures, to which a cone of cables 5 is fixed with clevises or the like, all of the cables leading to an apex, at which they are joined together and attached to a larger cable 6, of sufficient strength to resist the entire drag of the airship in the passing wind. Cable 6 leads downward at an angle, until it reaches the ground, at which point it is fixed to a base generally designated 40, and to be described later.

The cables 5 on the lower side of the airship are somewhat shorter than those on the upper side, whereby the airship under the restraint of the cable is held in a horizontal position in the wind.

The cone of cables not only provides a means of picking up the drag forces from all around the entrance to the tubular airship, but also makes more visible the entrance, which should reduce the number of birds that might enter the airship.

While only a single cable 6 is illustrated in FIGS. 1, 2, and 3, it is also contemplated that dual over-and-under cables could be used, one such cable leading either to the upper half of the cone of cables, and the other to the lower half of the cone, or else the second cable leading to a bridle attached to the sides of the airship back nearer the center of gravity. In the case of dual cables, by shifting the load from one to another by means that will be described later, it is possible to change the aspect of the airship entrance to the oncoming wind.

Since in some circumstances the tail portion of the described tubular airship may be somewhat heavy for lack of sufficient volume of helium, and may not be sufficiently rigid for lack of sufficient cross-sectional structure, it is considered desirable to provide a secondary lighter-than-air ship external to the tail portion of the primary structure. This secondary airship is designated 4 in the figures, and comprises a short tubular structure of semi-rigid construction, perhaps better called an annular airship. The annular airship surrounds the tail portion of the primary tubular ship, and preferably is slightly spaced therefrom, whereby there is an annular slot between the two ships. Diameter and position of the interior skin of the secondary ship is so selected that an annular entrance nozzle 16 between the two ships converges to a smaller annulus 17 directly adjacent the tail 14 of the primary airship, then increases. This construction is particularly well shown in FIG. 3, where the minimum cross-section at the vena contracta is designated 17. The annular vena contracta, in accordance with fluid flow principles, provides a region of reduced pressure into which the wind leaving the tail of the primary airship enters; because of this reduced pressure, the entrance of this wind is facilitated, and in effect, some of the energy in the wind passing through the annular passageway is added to the energy extracted from the wind passing through the primary airship.

The outer surface 21 of the annular airship should be shaped as to introduce minimum drag from the passage of the mainstream wind by the total airship, and this minimum drag is achieved by a smooth fairing of the outer surface from its junction with the entrance end 16 of the annular airship to its junction with the tail at 18.

The outer surface of the annular airship may be provided with projecting airfoil surfaces 19, the vertical ones of which provide stabilization against yawing, and if made adjustable, may also provide for some steering effect. The horizontal surfaces likewise provide for stabilization of the airship, and if adjustable, may add some degree of control of the tail lift if not adequately controlled by tethering cables and bridles.

Semi-rigid spokes 15, of inflated fabric construction like that of most of the airship, provide for spacing the secondary ship in its described location at the tail of the tubular airship.

The projecting airfoil surfaces 19 have been described as parts of the annular airship 4, but it will be obvious that if only the central tubular airship 3 is used, these surfaces could be attached to the tubular airship.

In U.S. Pat. No. 3,986,787 issued Oct. 19, 1976 to the present applicants, there is disclosed a turbine wheel structure suitable for use in the tubular airship of the present invention, and this disclosure is incorporated herein by reference. Also, in the U.S. Pat. No. 4,095,918 filed Dec. 2, 1976, and allowed Feb. 3, 1978, to the present applicants, modifications of this turbine wheel are described and claimed, using relaxed catenary construction of the blades; this type of turbine blade is particularly applicable to the present invention because of the large reduction in weight that may be effected, as compared with rigidly constructed straight turbine blades. This application is also included herein by reference.

For a lighter-than-air craft, it is preferable that no large torques tending to rotate the craft on its axis should be present, for such torques would have to be overcome by the use of large airfoil surfaces such as 19, but tilted to introduce a reverse torque, and such surfaces would decrease the overall efficiency of energy recovery from the wind. Accordingly, for the present invention it is desirable to use a pair of counter-rotating turbine wheels, whereby an essentially complete balance of torques is achieved. By "counter-rotation" is meant that one wheel has its blades pitched in one direction, and the other wheel is of the opposite pitch, whereby the impinging wind tends to rotate them in opposite directions. As shown in FIG. 2, a set of airfoils 31 may be placed in the passageway for the air, (as shown, downstream, but could be elsewhere) and these foils may have a small and adjustable pitch, whereby any residual unbalanced torque tending to rotate the airship on its axis is overcome.

The wind power abstracted by the turbine wheels may be removed from the wheels and transferred to the ground for utilization by any of several ways. Most desirable would be to power an electrical generator carried in the airship, but it can be shown that this is difficult with present day generators because of their great weight and because of the weight of electrical conductors leading to the ground. Accordingly, for the present invention it is preferred to conduct the power as mechanical energy to the ground using long endless belts or cables, leading from sheaves or other driving arrangements on the airship to sheaves and generators on the ground. Two ways of driving the belts or cables are described, as alternatives.

The first of the alternatives is shown in FIGS. 2 and 3. In FIG. 3, particularly, there are shown between the rims 25 of the turbine wheels two bevel gears 27. These gears mate with gear teeth carried on the sides of the rims 25, and are driven by the rim teeth. The gears 27 are carried on the ends of two shafts 28 that extend outwardly in a horizontal plane through the side walls of the tubular airship 3. The shafts are carried on inboard and outboard bearings that are not detailed, but are part of the rigid structure 26, separating the interior tube of the airship from its exterior. Outwardly of the said exterior the shafts carry sheaves 29, on which ride endless cables designated 8, the cables extending to the ground. In order that the incoming end of each cable may not jump the groove in its sheave, a fairlead 30 is provided, having a hole through which the incoming end of the cable is passed and guided just before it reaches its sheave.

Figure 6:
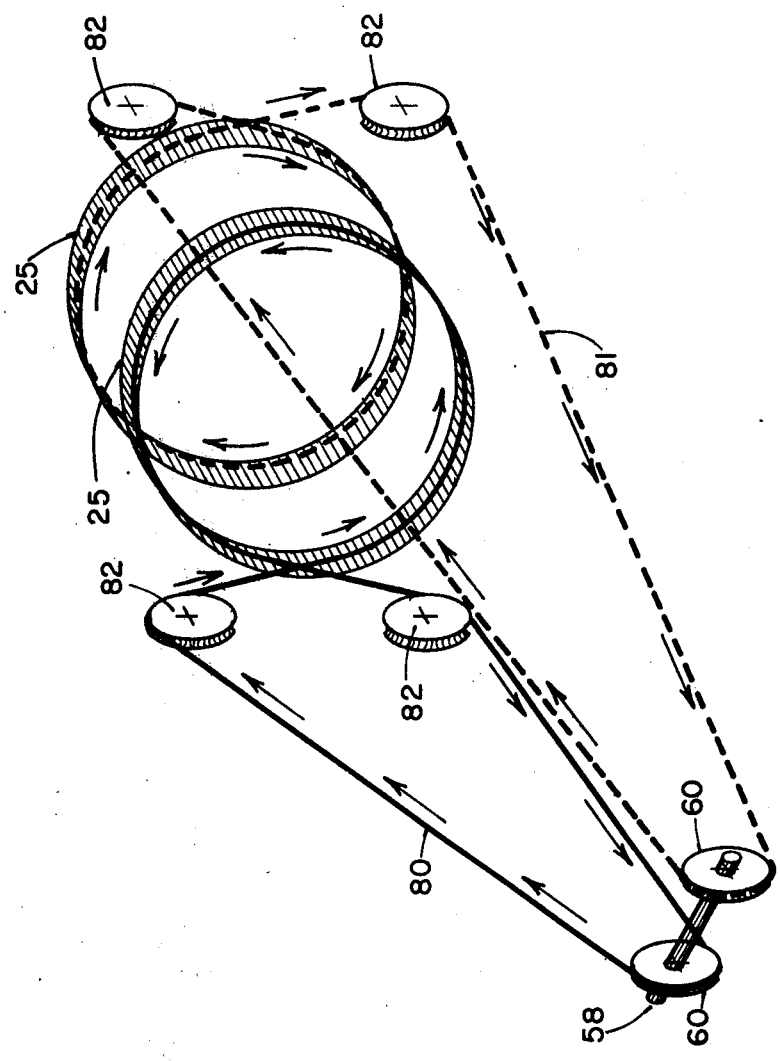
FIG. 6 shows an alternative for the endless cable power transmission system.

The other alternative involves the use of the rim of each turbine as a sheave, as was taught in the U.S. Pat. No. 3,986,787. This alternative is illustrated diagrammatically in FIG. 6. The turbine rims are designated 25. Around one rim a bight of endless cable 80 is wrapped, and the cable is extended over direction-changing sheaves 82, turning the cable in the direction of the ground. At the ground the cable passes over one sheave 60, carried on generator shaft 58. The other endless cable 81 similarly wraps around the other turbine rim 25, passes over direction-changing sheaves 82, and on toward the ground.

Figure 7:
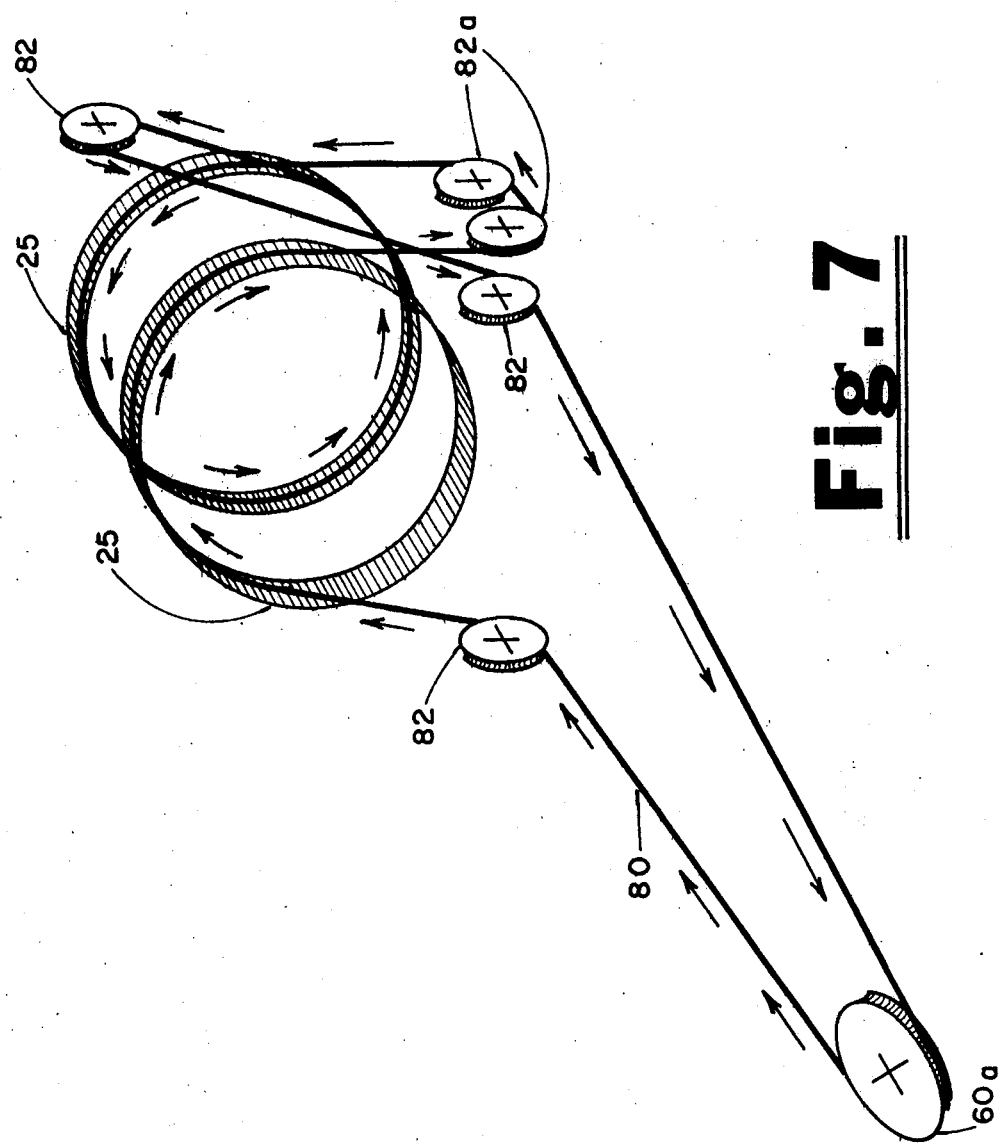
FIG. 7 shows a second alternative, in which a single endless cable encircles both turbine rims.

Yet another variation of the power transmission means is illustrated diagrammatically in FIG. 7, which shows the use of a single endless cable 80. Like the just described system, the endless cable proceeds from a driven sheave at the ground to the rims 25 of the turbine wheels; in this case, however, intermediate idle sheaves 83A inserted in the system between the two turbine rims, and these sheaves serve to take the cable leaving one rim and to redirect it to feed onto the second turbine rim, from which it passes over sheave 82, which redirects it toward the ground sheave 60A.

In some situations, should there be a tendency to fluttering of the power cables, and possible entanglement with one another or with the tethering cables, it may be desirable to insert some spacers along the length of the cables. These spacers can each be of simple design, comprising idling sheaves over which the cables are led by way of fairleads, the sheaves being spaced apart by simple structure means, and being suitably anchored along the tethering cable, and being sustained against their own weight by a small lighter-than-air balloon for each spacer.

Figure 4:
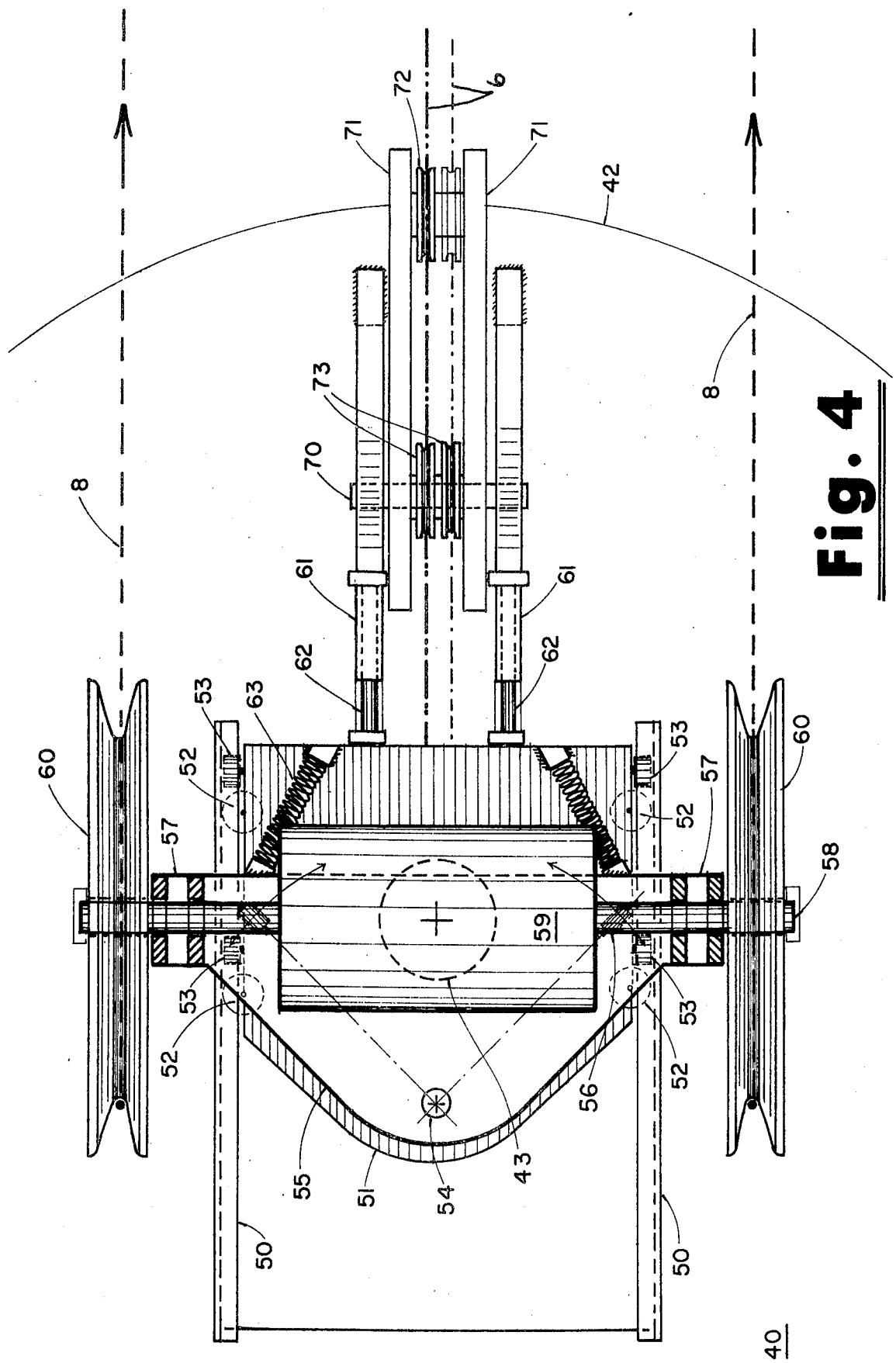
FIG. 4 shows a plan view of the turntable, tethering, and power take-off sheaves and generator.
Figure 5:
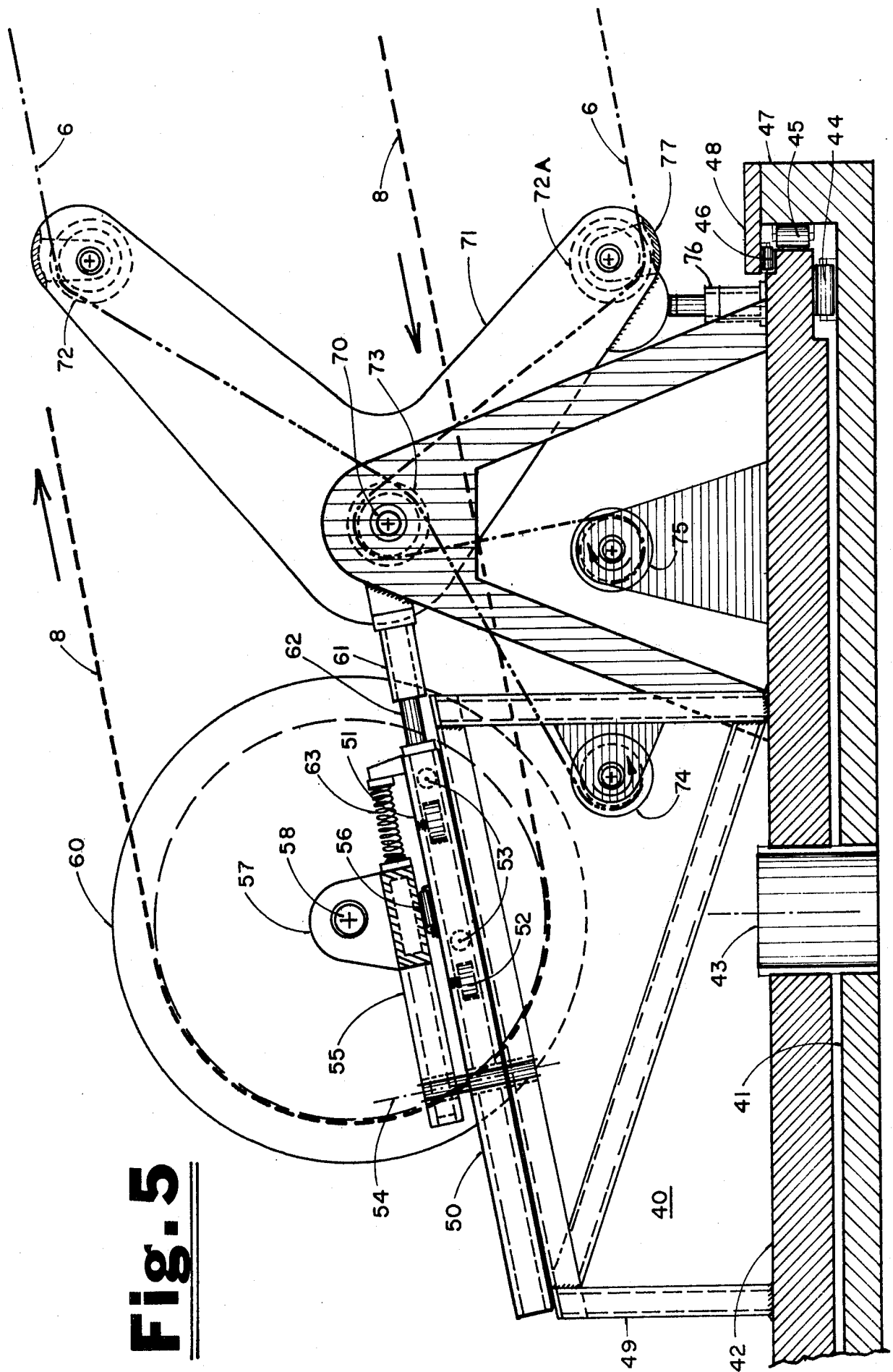
FIG. 5 shows an elevation in partial section of the turntable, tethering, and power take-off sheaves and generator.

In FIGS. 4 and 5 are shown in plan view and in partially sectioned elevation the base, turntable, tether adjustment, and power takeoff system at the ground.

A base-plate 41 is securely attached to the ground, and carries a vertical pivot pin 43, on which rides a circular turntable 42. In order to facilitate rotation of the turntable in response to changes in direction of the wind, its edges, bottom, top, and outer periphery, are supported in trunnion bearings 44, 46, and 45, respectively, these bearings being suitably mounted on the outer part of the base plate, on a top-side turned-in edge 48, and on an up-standing annular edge 47. A structural framework 49 is carried on the topside of the turntable, and on this framework is mounted both the tether cable winching and adjustment system, and the power-take-off system.

Eccentric to the pivot 43 are carried sheaves 72 and 72A, one of these receiving the incoming end of an upper tethering cable and the other the similar end of a lower tethering cable 6. The two sheaves 72 are carried on the outer ends of vertical bridle arm 71, the center of which is pivoted on shaft 70, which is mounted in the structure 49. Shaft 70 also carries two idling sheaves 73, over one of which the upper tether cable passes, while the other receives the lower tether cable. The two cables then pass respectively to the upper winch 74, and the lower winch 75. Changing of the degree of tilt of the bridle arm 71 is secured with the aid of a hydraulic cylinder and piston 76, which is attached at one end to the turntable structure 49 and at the other end to the outer end of the bridle arm at 77. The purpose of this ability to shift the bridle arm is to secure a vernier adjustment of the two thether cables with respect to one another. If one of these tether cables is attached to the airship at its front end, as earlier described, and the other is attached at a point further aft, such as near the center of buoyancy, shifting of the cable lengths in a small degree will permit a small change in aspect of the airship axis in the incoming wind stream. The same kind of change can be secured with the two winches 74 and 75, but the degree of control may be less precise, and such winching may have a greater and undesirable effect on the tightness of the power take-off cables.

Mounted approximately above the center of the turntable on the upper part of the structure 49 is a set of two parallel tracks 50, inclined upwardly in the direction toward the airship. On these tracks is carried plate 51, provided with rollers 52 and 53, which engage the parallel tracks, and are enabled to move a short distance in the direction toward and from the airship. Pivoted on a pin 54 projecting above the plate 51 is a mounting for the generator and its sheaves and bearings. This mounting, designated 55, is termed a power cross arm; it is supported above plate 51 on rollers 56 whose axes if extended would pass through pivot pin 54. The shaft 58 of generator 59 is carried in bearings 57, and the shaft carries on its outboard ends sheaves 60 over which the endless cables 8 pass. The plate 51 can be forced in a direction away from the airship by pistons 62 extending from cylinders 61. By this means the tightness of the endless cables can be regulated. However, in some instances there may be small differences in length of the two cables, and there may be small changes in forces on the two cables as the wind shifts direction. To overcome deleterious effects of this sort, the shaft 58 of the generator is mounted a short distance toward the airship from the pin 54, whereby such changes in cable forces or cable lengths will be automatically balanced out by a small angular movement of the power cross arm about its pivot. Means equivalent to large coil springs are shown at 63, the purpose of which is to absorb sudden shocks from veering of the wind, and to enable the whole turntable to be gradually pulled around as the wind changes its steady direction.

Not shown in the drawings are limit switches or equivalent structure at the ends of the tracks 50; these switches if actuated by movement of the mounting plate to its most extreme positions, would cause the winches 74 and 75 to let out or take in as needed small amounts of the cables 6.

It was earlier stated that if two cables 6 were used for tethering the airship, one of them could be attached to the cone of cables 5, while the other would be attached to a bridle arrangement extending to airship attachment points near the center of buoyancy. Alternatively, the cone of cables could be divided into an upper and a lower half, and the tether cables attached to their corresponding halves.

In the case of the cable arrangement described in connection with FIG. 7, the arrangements on the base plate can be somewhat simplified as compared with those just detailed. Since only the single endless cable 80 is used for this alternative, it is desirable to turn the driven sheave 60 on the turntable from a horizontal axis to a vertical axis, as shown on FIGS. 7 and 8. Most conveniently, the generator 59 also is on this vertical, or nearly vertical axis, and its mounting on the turntable can be in simple gimbal ring 104 with axis 105 above structure 49; in this case it will be desirable to provide a simple hydraulically operated tilting mechanism, (cylinder 100, rod 101, and bearings 102 and 103) to enable tilting of the generator 59 so that its shaft is at right angle to the incoming endless cable 80. The power cross arm becomes unnecessary, and can be omitted, together with its auxilliaries, the shock absorber springs 63, and the pivot 54, as well as the bearings 56.

EXAMPLE

Calculation of the energy in a stream of wind

Assume a 200 ft. diameter windstream at 30 mph is to be intercepted by a tubular airship, and accelerated into a 100 ft. diameter turbine, with which a portion of the wind's energy will be abstracted.

1. From Bernouilli's equation, the total kinetic energy in one lb. mass of air is $V^2/2g_c$, where $V$ = wind velocity, ft. sec.

$g_c$ = conversion constant, $32.17 \frac{lb \times ft}{lb\ force \times sec^2}$ Energy = $(44\ ft/sec)^2 \times \frac{1\ lb\ force \times sec^2}{2 \times 32.17\ lb\ mass \times ft}$
= 30.09 lb force × ft per lb mass 2. At 30 mph, (44 ft/sec) the mass of air entering one square foot is 44 ft/sec × 1 ft² × 0.08 lb/ft³ = 3.52 lb/sec 3. Area for 200 ft diameter = $200^2 \times pi/4$ = 31,400 ft²

4. Energy for 200 ft diameter air stream =
$30.09 \frac{ft \times lb\ force}{lb\ mass} \times 3.52 \frac{lb\ mass}{sec \times ft^2} \times 31,400\ ft^2$
= 3,326,000 ft. × lb force/sec 5. Energy in kilowatts = 3,326,000 × 0.0013558 = 4509 kilowatts 6. Maximum energy that can be extracted by the use of any kind of current motor is 59.2% (Mark's Handbook for Mechanical Engineers, 7th edition, section 9, page 8, McGraw-Hill, 1967)

7. Maximum available energy from 200 ft diameter windstream = 4509 kw × 0.592 = 2669 kw.

What we claim is:

1. In a lighter-than-air craft tethered in the wind by a tether leading from the craft to the ground, the improvement comprising
   (a) a nozzle having a tubular wall, an entrance end, and a discharge end, and a vena contracta between said ends, said nozzle passing through said craft, said entrance end opening at the windward end of said craft, and said discharge end opening at the leeward end of said craft, whereby wind is intercepted and guided through said nozzle, said nozzle having at the vena contracta an annular recess in its tubular wall,
   (b) annular bearing structure mounted in said recess,
   (c) turbine wheel means comprising at least one turbine wheel carried on said bearing structure coaxial within said nozzle for rotation by the intercepted wind,
   (d) an endless cable drive in the form of at least one elongated loop of cable extending from the craft to the ground,
   (e) electrical energy generation means comprising a generator on the said ground,
   (f) sheave means drivingly coupling each turbine wheel to the endless cable drive, and
   (g) other sheave means on the ground drivingly coupling the endless cable drive to the said energy generation means.

2. In the apparatus of claim 1, each turbine wheel comprises an axle-less, axial-flow turbine wheel, a shroud-ring rim forms the periphery of said wheel, said rim bears against the said bearing structure, is supported thereby, and in turn supports the rest of the turbine wheel, said bearing structure taking thereby both axial and radial loading of said wheel.

3. The apparatus of claim 1, in which the said turbine wheel means comprises two axially aligned wheels of equal but opposite pitch.

4. The apparatus of claim 2, wherein the rim of each turbine wheel has a periphery shaped to engage the said endless cable drive, the endless cable rides upon said rim, and is driven thereby.

5. The apparatus of claim 2, wherein the periphery of the rim of each turbine wheel is formed as a ring gear, at least one stub shaft extends angularly from an inner end in said recess through the wall of said nozzle, and through the exterior surface of the craft to an outer end, a gear pinion mating with the ring gear is fixed on the said inner end of the at least one stub shaft, and said sheave means is fixed on the said outer end, said sheave means being drivingly coupled to the endless cable drive.

6. The apparatus of claim 2, comprising two counter-rotating turbine wheels, said endless cable drive having two endless drive cables, one of said cables being coupled to the rim of one of said wheels, and the other endless cable being coupled to the other wheel.

7. The apparatus of claim 2, comprising two counter-rotating turbine wheels, said endless cable drive having a single endless cable, said sheave means having an idler sheave means, the single cable being coupled first to the rim on one of said wheels, then passing through the idler sheave means to change direction, then being coupled with the rim of the second of the turbine wheels.

8. In the apparatus of claim 1, said tether comprising an upper tether cable and a lower tether cable, each said tether cable having a ground end and an elevated end, bridle means comprising a cone of cables attached to the windward end of said craft, and subdivided into an upper part cone and a lower part cone, winching means on the ground comprising an upper winch and a lower winch, the upper winch being attached for winching action to the ground end of the upper tether cable, the elevated end of said upper tether cable being attached to the apex of the upper part cone, the lower winch being attached for winching action to the ground end of the lower tether cable, and the elevated end of said lower tether cable being attached to the apex of the lower part cone.

9. The apparatus of claim 8, including a bridle arm comprising two individual arms extending in opposite directions from a central pivot shaft to outer ends, said sheave means having one outer idling sheave pivotted on each said outer end and two central idling sheaves pivotted on said central pivot shaft, operating means for angling said bridle arm on said central pivot shaft, the upper tether cable passing over one of said outer sheaves, thence over one of said central sheaves, enroute to the upper winch, the lower tether cable passing over the other of said outer sheaves, thence over the other of said central sheaves, enroute to the lower winch, whereby changing the angle of said bridle arm will pull in one of said tether cables with respect to the other of said tether cables.

10. The apparatus of claim 1, in which the generator has a horizontal driving shaft extended at both ends, said sheave means comprises two driven sheaves mounted on opposite ends of said shaft, said endless cable/drive comprises two endless cables in parallel, one said cable being coupled around each of the driven sheaves.

11. The apparatus of claim 10 with a power cross arm pivotted above a base plate, and supporting the generator, the pivot of the cross arm being located between the centerlines of the two endless cables, and to the rear of the sheaves, and means comprising spring-loading and cross-arm retraction mechanism, whereby the two endless cables can be loaded equally and adjustably.

12. The apparatus of claim 1, in which the generator is mounted with a nearly vertical shaft, said shaft carrying a single drive sheave of said sheave means, and tilt-adjustment means coupled to said generator to tilt its axis in order to maintain alignment of the sheave with the endless cable drive.

* * * * *